United States Patent [19]

Yamauchi

[11] 4,112,470
[45] Sep. 5, 1978

[54] SYSTEM FOR REPEATEDLY REPRODUCING A RECORDED MATERIAL OF A LIMITED DURATION

[75] Inventor: Satoshi Yamauchi, Yokohama, Japan

[73] Assignee: Ricoh Co., Ltd., Tokyo, Japan

[21] Appl. No.: 655,574

[22] Filed: Feb. 5, 1976

[30] Foreign Application Priority Data

Feb. 6, 1975 [JP] Japan .................................. 50-15783

[51] Int. Cl.² .................... G11B 15/26; G06K 13/18; G06K 13/24
[52] U.S. Cl. ...................................... 360/88; 235/475; 235/483; 360/90
[58] Field of Search .................... 360/90, 91, 92, 93, 360/94, 88; 35/35 C, 48 R; 235/61.11 D, 61.11 R, 61.12 M; 346/150–165

[56] References Cited

U.S. PATENT DOCUMENTS

| | | | |
|---|---|---|---|
| 3,056,134 | 9/1962 | Beyer | 360/88 |
| 3,114,512 | 12/1963 | Peshel | 360/90 |
| 3,254,856 | 6/1966 | Camras | 360/90 |
| 3,342,952 | 9/1967 | Meyer | 360/90 |
| 3,373,508 | 3/1968 | Holden | 35/35 C |
| 3,389,915 | 6/1968 | Owen | 360/90 |
| 3,469,847 | 9/1969 | Kral | 360/88 |
| 3,550,984 | 12/1970 | Moore | 360/90 |
| 3,610,635 | 10/1971 | Schiff | 35/35 C |
| 3,648,387 | 3/1972 | Lahr | 35/35 C |
| 3,715,570 | 2/1973 | Weichselbaum | 235/61.12 M |
| 3,831,199 | 8/1974 | Vollum | 360/94 |
| 3,918,094 | 11/1975 | Rudd | 35/35 C |

Primary Examiner—Robert M. Kilgore
Attorney, Agent, or Firm—Cooper, Dunham, Clark, Griffin & Moran

[57] ABSTRACT

A system for repeatedly reproducing recorded information of a limited duration, suitable for use as a learning medium, using a multiplicity of recording tapes of a predetermined length, each having respective information recorded thereon, and a special playback unit. The playback unit comprises a circulating path having an inlet and an outlet for the tape. When the tape is inserted through the inlet into the circulating path, it is circulated about the path a desired number of times so as to repeatedly reproduce the information recorded thereon and when ejection means is operated, the circulating tape is inserted from the path into the outlet to be ejected outside the unit. The tapes which are not in use may be conveniently sorted or stored by means in accordance with the invention.

17 Claims, 22 Drawing Figures

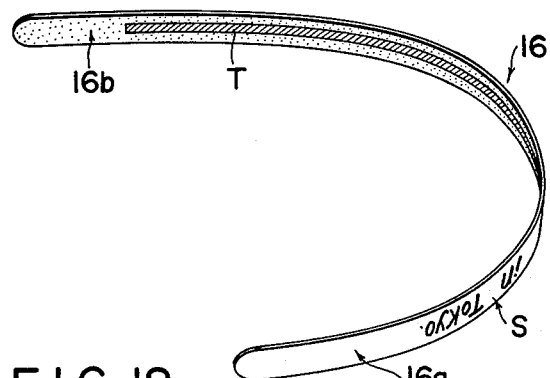
FIG. 11
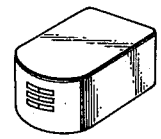
FIG. 12
FIG. 13
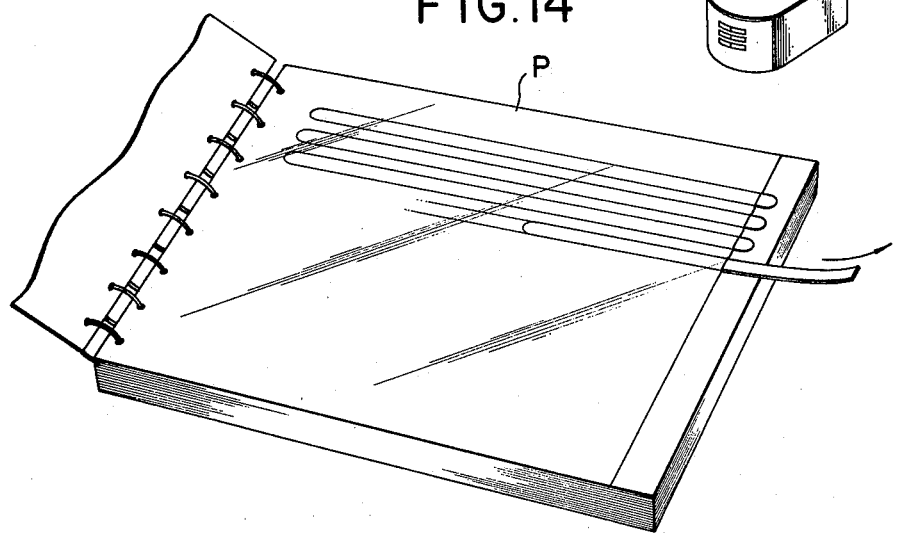
FIG. 14

SYSTEM FOR REPEATEDLY REPRODUCING A RECORDED MATERIAL OF A LIMITED DURATION

BACKGROUND OF THE INVENTION

The invention relates to a system for repeatedly reproducing a recorded material of a limited duration, and more particularly to such a system adapted for use as a learning instrument.

A tape recorder is frequently utilized as a learning instrument, with a magnetic tape containing a varying degree of teaching material which may be arranged in a predetermined program. The recorded tape has a playback time which usually exceeds 20 minutes. Where such a recorded tape is used for linguistic purposes to teach a foreign language to beginners, it is often desirable to repeat a brief sentence in a consistent tone. This is usually achieved by repeatedly reproducing a selected portion of a recorded tape, which requires a repeated rewinding of the tape as many times as the reproduction is desired. However, it is troublesome to operate the tape recorder each time the beginner desires to listen to a given sentence repeatedly. The degree of inconvenience will be appreciated if one considers the fact that sentences used for beginners are usually of a short duration such as a sentence "SPRING HAS COME", which will be terminated in a matter of a second if spoken at a usual rate of conversation. Also, the required frequency of operation of the tape recorder will cause undesirable wear thereof.

To avoid these difficulties, a tape may be repeatedly recorded with a succession of the same brief sentence so that the sentence may be repeated without requiring a rewinding of the tape. However, the procedure contains several inconveniences which render it impractical. Specifically, the number of times the reproduction is repeated is determined independently from the intention of the beginner which varies from individual to individual, and the beginner is forced to follow the sequence of teaching materials which are contained in a single tape of substantial length. Thus, it is difficult to freely choose a particular sentence which a particular beginner desires to hear repeatedly. Where a number of brief sentences are recorded in a single tape, if the beginner desires to find a particular sentence, he has to locate it by running the tape. It will be readily appreciated that such an operation of the tape recorder requires a considerable amount of labor and time. In addition, the recording of a brief sentence on a single tape at a number of successive tape portions means a waste of the tape material, and the number of recorded tapes which must be prepared also increases.

Another approach for a repeated playback of a short sentence is the use of an endless tape which has a reduced circulation time. However, the loading and unloading of the endless tape onto or from the playback unit is troublesome, and there must be some tape stowage means for containing a number of endless tapes which is convenient in handling the tapes.

SUMMARY OF THE INVENTION

It is an object of the invention to provide a system for repeatedly reproducing recorded material of a limited duration which is particularly advantageous for repeated reproduction of a short sentence and which avoids the disadvantages of the conventional tape recorders as used in such applications.

In accordance with the invention, a recorded tape having a playback time on the order of 2 to 20 seconds is continuously run along a circulating path for playback purposes. A number of recorded tapes may be provided as desired by the student, and can be freely chosen for playback. The recorded tape will have a reduced length, which may be 12 cm for a tape having a playback time of 3 seconds when it is run at a speed of 4 cm/sec. Recorded tapes of such a length can be received on a single sheet by disposing them in pockets formed side by side, and the student can extract a desired tape from the sheet to be inserted into a tape inlet of the playback unit. When inserted, the recorded tape runs along a circulation path in the playback unit to produce a repeated reproduction. When it is desired to remove the recorded tape from the playback unit, a pushbutton located on the sidewall of the playback unit may be operated to divert the tape from the unit through the inlet or a seprate tape outlet. In this manner, the student can freely choose his desired tape and repeat its playback as many times as desired without requiring any operation of the playback unit in the meantime. This facility of repeated playback is particularly advantageous for linguistic purposes. The playback unit can be constructed in a simple and compact, form, and operated in a simple manner.

BRIEF DESCRIPTION OF THE DRAWINGS

FIG. 11 is a perspective view of one example of a magnetically recorded tape which may be used in the playback unit of the invention;

FIG. 12 is a plan view of another example of the recorded tape;

FIG. 13 is a perspective view of one example of multiple playback head;

FIG. 14 is a perspective view of one example of recorded tape stowage means in the form of a sheet;

DETAILED DESCRIPTION OF EMBODIMENTS

Figure 1:
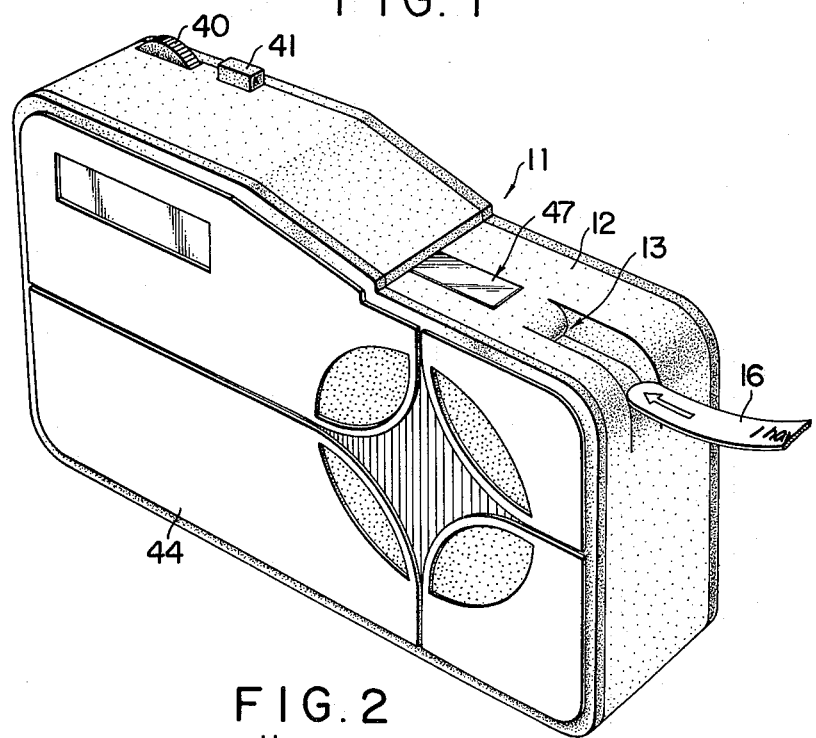
FIG. 1 is a perspective view of a playback unit constructed in accordance with one embodiment of the invention.
Figure 2:
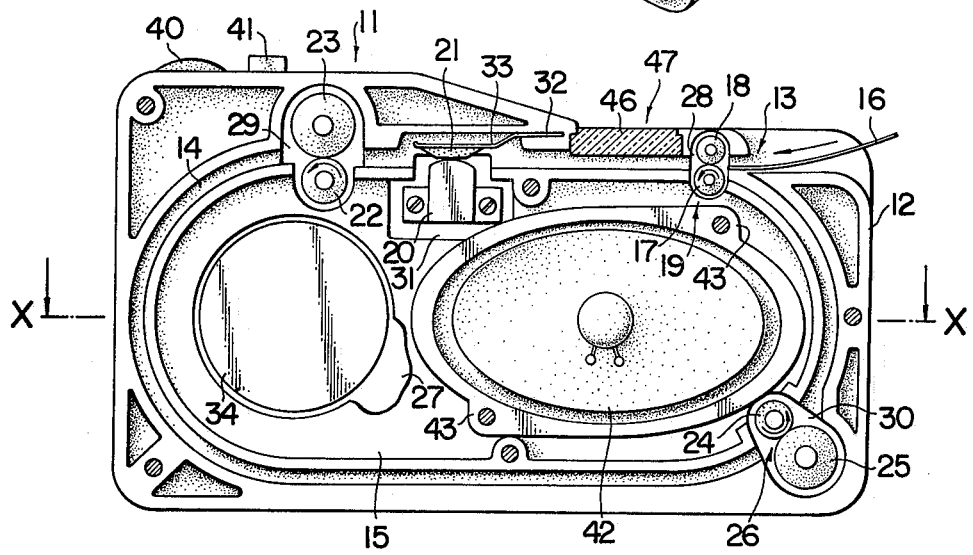
FIG. 2 is a front view of the playback unit shown in FIG. 1 with a front cover removed to show the tape circulating path.
Figure 3:
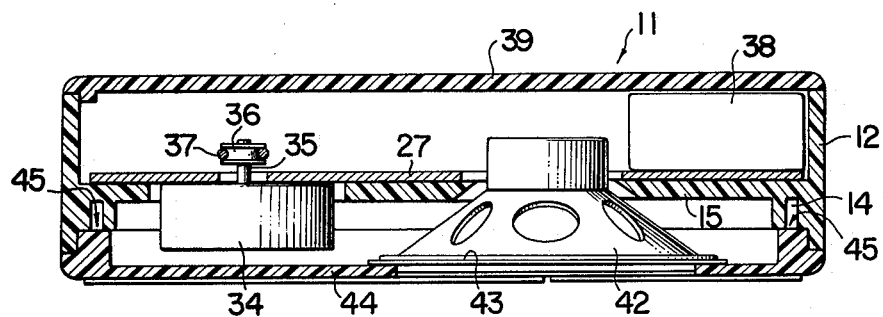
FIG. 3 is a cross section taken along the line X—X shown in FIG. 2.

Referring to FIGS. 1 and 2, there is shown a playback unit 11 having a sidewall 12 which is formed with a tape inlet 13. The inlet communicates with a portion of a tape circulating path 14 which is formed within the playback unit. As best shown in FIG. 3, the tape circulating path 14 is defined by the sidewall 12 and a partition 15, and the wall surface which forms the path 14 is finished so as to assure a smooth running of a recorded tape 16 and to permit a smooth penetration of the leading edge thereof into the path.

Disposed along the tape circulating path 14 are rollers 17, 18 forming a roller pair 19 which assists in the admission of the recorded tape 16 as it is inserted through the inlet 13, a magnetic playback head 20, a pad 21 located opposite the head for gently urging the recorded tape against the head 20, a capstan 22 and a cooperating pinch roller 23 which is held in abutment therewith, and mating tape feed rollers 24, 25 which form a roller pair 26. All of the rollers as well as the playback head 20 are mounted at fixed positions on a base plate 27 which is secured to the partition 15 on the opposite side from the tape circulating path 14, and project into the latter through openings 28, 29, 30 and 31 formed in the partition 15. The pad 21 is fixedly mounted on a relatively thin leaf spring 33 which is secured in position by being fitted into a slit 32 formed in the partition 15.

The capstan 22 and the rollers 17 and 24 are driven for rotation in the direction indicated by arrows from a small motor 34, which is also fixedly mounted on the base plate 27. The motor has a shaft 35 which, as shown in FIG. 3, extends to the opposite side of the base plate 27 and carries a pulley 36 on its free end. A belt 37 extends around the pulley 36 for driving the capstan 22 and the rollers 17 and 24. The motor 34 is a d.c. motor, and a battery therefor is received in a space 38 shown in FIG. 3, which is defined by the base plate 27, the sidewall 12 and a rear cover 39. If the playback unit is energized from an a.c. source, an associated rectifier and substantially all of the other electronics are mounted on the base plate 27.

Referring to FIGS. 1 and 2, a wheel 40 which serves both as a power switch and a volume control, and a tape ejection pushbutton 41 are disposed on the left-hand shoulder of the unit. With the power on when the pushbutton 41 is manually depressed, a switch (not shown) connected between the battery 38 and the motor 34 for controlling the forward or reverse rotation of the motor is thrown to the reverse position to rotate the motor 34 in the reverse direction and thus rotate the capstan 22 and the rollers 17 and 24 in the opposite direction from those indicated by arrows, that is, in the clockwise direction, as long as the pushbutton 41 is maintained in its depressed position. When the pushbutton 41 is released, the rotation of the motor 34 returns to the forward direction. A loudspeaker 42 is disposed laterally of the motor 34 and has a flange 43 which is secured to a front cover 44 of the playback unit.

As clearly shown in FIG. 3, both the front cover 44 and the rear cover 39 are disposed in abutment against the edge of the openings defined by the opposite ends of the sidewall 12, and are suitably secured thereto. The rear cover 39 is constructed to be easily removable from the sidewall 12. The front cover 44 has a peripheral rib 45 which is disposed against the opening of the tape circulating path 14 so as to form a wall thereof. A view window 47 closed by a transparent material 46 which is secured to the sidewall 12 is disposed along a portion of the tape circulating path which is located between the playback head 20 and the roller pair 19, thereby permitting an observation of the recorded tape as it travels along the path 14.

When the wheel 40 is turned to turn on the power switch, and the leading edge of the recorded tape 16 is inserted into the tape inlet 13, the tape is fed into the tape circulating path 14 by means of the roller pair 19. The recorded tape which is used in the playback unit of the invention has a length which is reduced as compared with the overall length of the tape circulating path 14 so as to prevent its leading end from being overlapped with its trailing end as it circulates along the path 14. The information recorded tape is repeatedly reproduced by the playback head 20 as it passes by the latter.

When it is desired to eject the recorded tape from the playback unit, the pushbutton 41 is depressed, whereupon the rotation of the capstan 22 and the rollers 17, 24 is reversed to move the tape in the opposite direction from the direction of movement during a playback operation, and when the trailing end of the recorded tape enters the nip of the roller pair 19, it is ejected externally of the unit through the tape inlet 13.

Figure 4A:
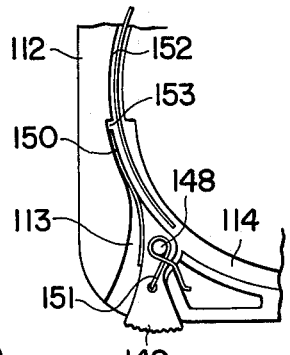
FIGS. 4A, B and C are fragmentary front views of one example of a tape ejector.
Figure 4B:
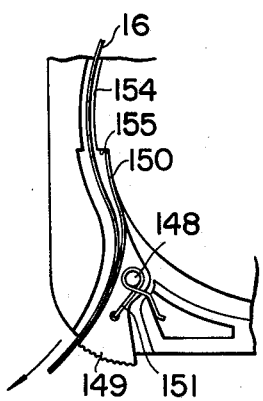

A tape outlet may be provided separately from the tape inlet. FIGS. 4 A–C show such an arrangement. In these Figures, a sidewall 112 is formed with a tape ejection passage 113 which provides a communication between a tape circulating path 114 and the outside of the unit. A path diverting member 149 is pivotally mounted on a pin 148 within the passage 113, and has an outer end which slightly projects externally of the unit for engagement with a finger of a user. The inner end of the member 149 has a tongue 150 fixedly mounted thereon which is formed of resilient material, for example, polyester film, and has substantially the same width as the recorded tape. A spring 151 is disposed on the pin 148 and has one end engaged with the diverting member 149 and its other end engaged with the sidewall 112 for urging the diverting member 149 counterclockwise about the pin 148. As a consequence, the diverting member 149 normally assumes a position in which the free end of the tongue 150 is received in a depression 153 formed in an outer wall 152 of the tape circulating path 114, thus forming a part of the wall defining the path. However, as shown in FIG. 4B, the path diverting member 149 may be slightly rotated about the pin 148 against the resilience of the spring 151 so that the free end of the tongue 150 bears against another depression 155 formed in an inner wall 154 of the tape circulating path 114, whereupon the path is closed by the tongue and now communicates with the exterior of the playback unit to guide the leading end of the recorded tape 16 externally of the unit as it reaches the innermost end of the tape ejection passage.

Figure 4C:
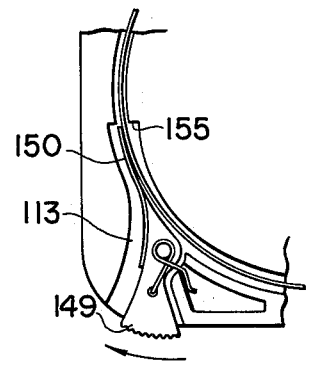

FIG. 4C illustrates the situation which occurs when the path diverting member 149 is operated to its tape ejection position as the recorded tape which moves along the tape circulating path has just closed the innermost end of the tape ejection passage. Under this situation, an operation of the path diverting member 149 cannot bring the free end of the tongue 150 into the depression 155 since it is blocked by the recorded tape. An interference with the running of the recorded tape can be avoided, however, by reducing the resilience of the tongue 150 to a suitable level, and when the recorded tape runs clear of the tongue 150, the latter is moved into its position in the depression 155, after which it serves to guide the leading end of the recorded tape externally of the playback unit. When the path diverting member is used, the tape ejection pushbutton 41, which has been mentioned above in connection with the arrangement of FIG. 1, is omitted since there is no need to drive the recorded tape in the opposite direction from that assumed during a playback operation. The arrangement shown in FIGS. 4 A-C is advantageously used with a recorded tape having a certain degree of resilience, such as those formed by polyester film or resilient processed paper.

Figure 5:
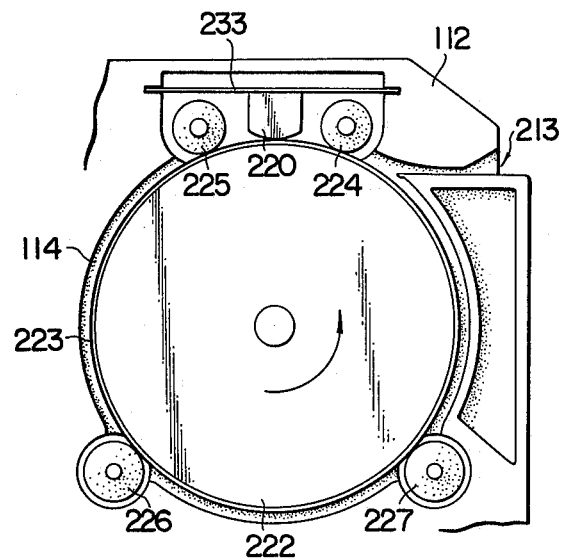
FIG. 5 is a front view of another embodiment of the invention.

Various alternate means may be utilized for circulating the recorded tape. By way of example, FIG. 5 shows a rotating disc 222 having a relatively large diameter on the order of 4 to 6 cm, for example, for driving the tape. The disc 222 is peripherally provided with a lining 223 of a material such as rubber which has a relatively large coefficient of friction with a recorded tape used. A plurality of rollers 224, 225, 226 and 227 are held in gentle abutment against the lining 223, and a playback head 220 is disposed intermediate the rollers 224 and 225 and is held in gentle abutment against the lining 223 by a resilient blade 233 which has its opposite ends engaged with a sidewall 112. It will be appreciated that the playback head may be effectively mounted in various other manners. The sidewall is formed with a tape inlet 213, and a recorded tape inserted into the inlet is carried by the disc 222, rotating in the direction indicated by an arrow, along the tape circulating path 214 so that the information on the tape is repeatedly reproduced by the playback head 220. The ejection of the recorded tape from the unit may be achieved by either reversing the rotating of the disc 222 to eject the tape through the inlet 213, or by using the path diverting member shown in FIGS. 4 A-C to eject the tape from a tape outlet (not shown) which is separate from the tape inlet 213.

Figure 6:
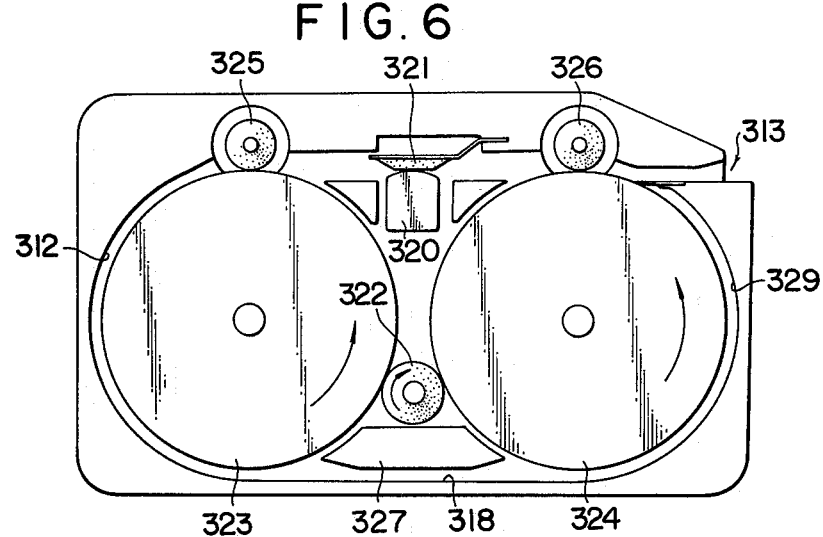
FIG. 6 is a front view of a further embodiment of the invention.

Referring to FIG. 6, there is shown another example of means for circulating the recorded tape. Specifically, a pair of rotating discs 323 and 324 of an equal diameter are disposed in abutment against a capstan 322 which is adapted to be driven for rotation in the direction indicated by an arrow from a motor, not shown. One of the discs, 323, is engaged by a pinch roller 325, while the other disc 324 is engaged by another pinch roller 326. A playback head 320 and a pad 321 are disposed on the opposite sides of a tape path which extends between the pinch rollers 325 and 326. A recorded tape which is inserted into a tape inlet 313 moves along a circulating path so that the information thereon is repeatedly reproduced by the playback head 320. The circulating path comprises a portion extending between the pinch rollers 326 and 325, a second portion defined by curved wall 312 and the periphery of the left disc 323, a third portion defined by a rectilinear wall 318 and a guide member 327, and a fourth portion defined by a curved wall 329 and the periphery of the right disc 324. The ejection of the recorded tape may take place by either means mentioned above.

Figure 7:
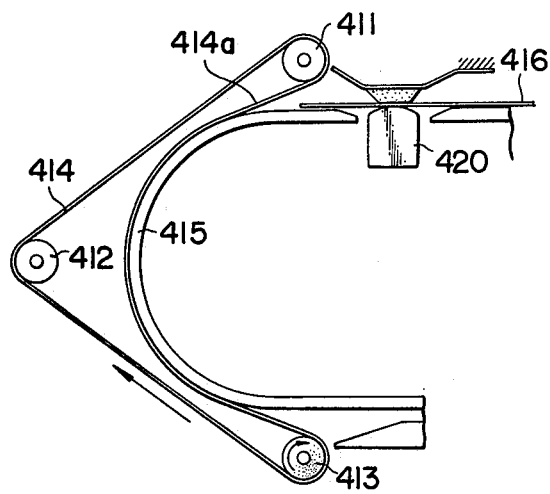
FIGS. 7 to 10 are fragmentary front views of additional embodiments of the invention.

FIG. 7 illustrates the use of a belt for conveying a recorded tape along a curved portion of a tape circulating path. In this Figure, there are provided three pulleys 411, 412 and 413, around which extends an endless belt 414. Belt 414 includes a run or portion 414a extending between the pulleys 411 and 413 which is disposed in abutment against the outer periphery of a curved guide member 415, which is integral with the body of the playback unit. The pulley 413 is driven by a motor, not shown, for rotation in the direction indicated by an arrow, driving the endless belt 414 in a direction indicated by an arrow. After passing over a playback head 420, a recorded tape 416 is introduced into the nip between the guide member 415 and cooperating endless belt portion 414a, which cooperation drives the tape. The surface of the guide member 415 which is engaged by the belt portion 414a is finished to produce a smooth movement of the recorded tape, while the surface of the endless belt 414 which is adapted to engage the guide member is finished to produce as much friction as possible with the recorded tape. Such an arrangement including the endless belt and the guide member may be employed anywhere along a curved portion of the tape circulating path.

Figure 8:
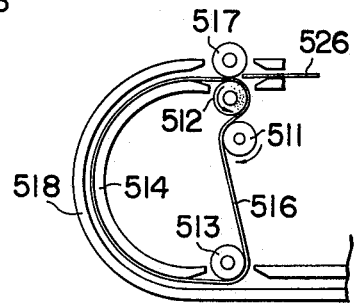

In FIG. 8, a curved portion of the tape circulating path is defined by an inner curved guide member 514 and an outer curved guide member 518, both of which are fixedly mounted. A pulley 512 is adapted to be driven by a motor, not shown, and an endless belt 516 extends around pulley 512 and a second pulley 511 located adjacent thereto, and along the guide member 514 and around a third pulley 513 to form a closed loop, thereby introducing a recorded tape 526 into the curved portion of the tape circulating path. The drive pulley 512 is driven to rotate in the direction indicated by an arrow.

Figure 9:
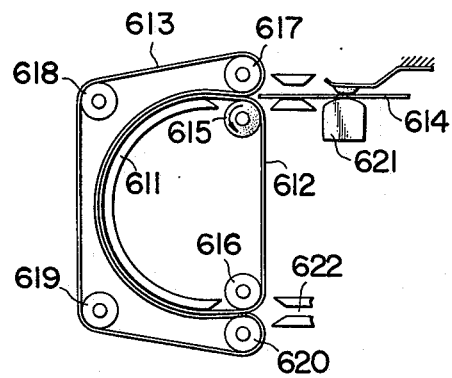

In FIG. 9, there is shown another arrangement for conveying a recorded tape along a curved portion of the tape circulating path. Specifically, there is provided a stationary curved guide member 611 around which a portion of an inner endless belt 612 and a portion of an outer endless belt 613 are disposed in overlapping relationship. The inner belt 612 extends around a pair of pulleys 615 and 616, the pulley 615 being a drive pulley which is adapted to rotate in the direction indicated by an arrow. The outer belt 613 extends around a drive pulley 617 which forms a pair with the drive pulley 615, and also around three other pulleys 618, 619 and 620. The portion of the belt 613 which extends between the pulleys 617 and 620 is disposed in overlapping relationship with the inner endless belt 612. The pair of belts cooperate to hold a recorded tape 614 therebetween to convey it along a curved portion of the tape circulating path after the tape has passed over a playback head 621, and the tape is subsequently delivered into a straight path 622.

Figure 10:
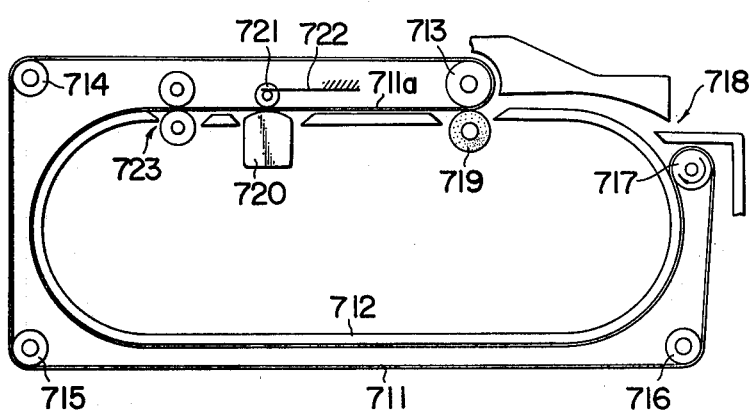

FIG. 10 shows a further arrangement in which substantially the entire tape circulating path is formed by a stationary guide member 712 and an endless belt 711 which is disposed in abutment with the guide member. The belt 711 has a substantial length and extends around a plurality of pulleys 713, 714, 715, 716 and 717. A portion 711a of the belt which extends between the pulleys 717 and 713 is disposed along the stationary guide member 712. The pulley 717 is driven for rotation in the direction indicated by an arrow by a motor, not shown, and a recorded tape which is inserted into a tape inlet 718 will be fed by a pinch roller 719 and the belt into the tape circulating path which passes over a playback head 720. A pinch roller 721 is biased toward the playback head 720 with the inter-position of the belt portion 711a therebetween. The pinch roller 721 is rotatably mounted on the free end of a resilient blade 722 which has its other end secured to the body of the playback unit, thus urging the recorded tape against the playback head 720 with a suitable pressure, as it passes by the head. A roller pair 723 is provided to prevent an oscillating motion of the recorded tape.

It should be understood that means for circulating the recorded tape is not limited to the configurations described above, and other changes and modifications will readily occur to those skilled in the art without departing from the spirit of the invention.

Referring to FIG. 11, there is shown a recorded tape 16 having a front surface 16a on which is printed a sentence S corresponding to the content of an acoustic signal which is recorded on a magnetic track T on the magnetic back surface 16b thereof, thereby allowing an immediate recognition of the content which is recorded on the tape. The sentence S is visible through the view window 47 when the tape is loaded into the playback unit, as illustrated in FIG. 1.

Where the time required to reproduce a single sentence is substantially less than the duration of a single tape, the sentence may be repeatedly recorded on the tape in successive locations in the same or different tone. For example, if a tape has an overall playback time of 5 seconds and a signal sentence content which could be reproduced within a time interval of two seconds is recorded thereon, the same sentence may be repeated twice during one circulation of the recorded tape. Alternatively, the sentence may be recorded in both an interrogative and an affirmative form.

FIG. 12 shows an example of a recorded tape having dual magnetic tracks. A first track may be recorded with a sentence with a reduced rate while a second track may be recorded with the same sentence, but with a rate of usual conversation. In this instance, the second track will be recorded with the same sentence in successive locations.

The number of tracks which are recorded on a single tape may be determined in accordance with the tape width. Such a multiple track tape can be reproduced by a multiple head as shown in FIG. 13, which illustrates a playback head for reproducing three tracks. The playback unit may be provided with a track selection switch for allowing the student a free choice of a particular track of the recorded tape from which a reproduction is made. Alternatively, the playback unit may be provided with a single track head which is disposed to be movable in a direction crosswise of the recorded tape so that the head may be selectively displaced to a particular position for cooperation with a desired track in response to a track selecting operation.

Figure 15:
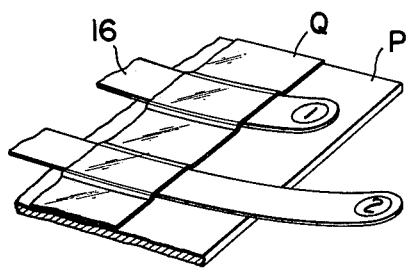
FIG. 15 is a fragmentary perspective view of the sheet shown in FIG. 14.
Figure 19:
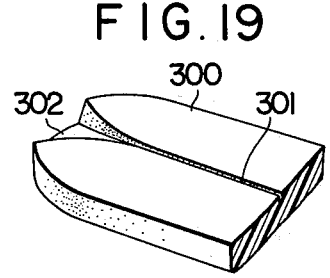
FIG. 19 is a perspective view, showing the left-hand end of FIG. 17 to an enlarged scale.
Figure 16:
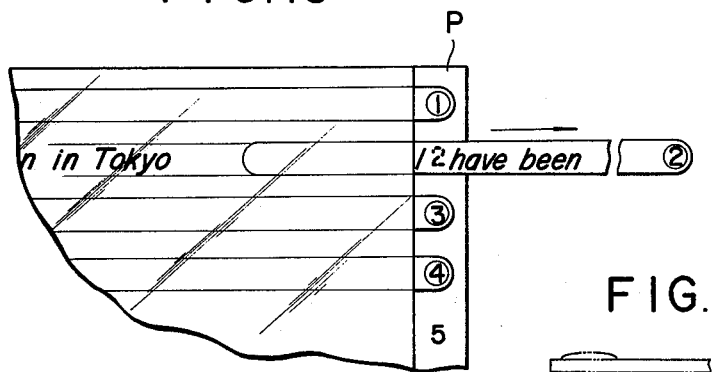
FIG. 16 is a fragmentary plan view of the sheet shown in FIG. 14.

As shown in FIG. 14, a plurality of recorded tapes may be stowed in juxtaposition on a single sheet P, and a plurality of such sheets may be filed together if desired. FIG. 15 shows a detailed arrangement of the stowage means. Specifically, a transparent sheet Q is applied to the sheet P so as to form a plurality of pockets which receive individual recorded tapes 16. In the region of individual pockets, the same sentence as recorded on the tape may be printed on the sheet so that when the tape is extracted from the pocket, the sentence is visible through the transparent sheet Q of the emptied pocket, thus facilitating a handling of the individual tapes (see FIG. 16). Similarly, numerals or characters may be applied to the corresponding pockets and tapes. Where the recorded material is directed to the learning of a foreign language, selected pockets may be disposed in pairs so that one includes a magnetic tape recorded with a foreign language and the other with a translation thereof. It will be appreciated that such sheet-shaped stowage means for containing a multiplicity of recorded tapes will greatly contribute to the ease of the learning.

Figure 18:
FIG. 18 is a cross section, to an enlarged scale, taken along the line Y—Y shown in FIG. 17.
Figure 17:
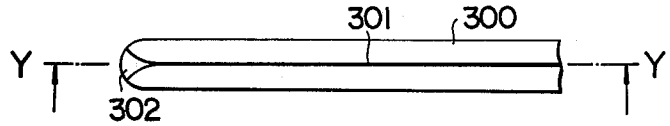
FIG. 17 is a fragmentary plan view of one example of the recorded tape having a recording groove.
Figure 20:
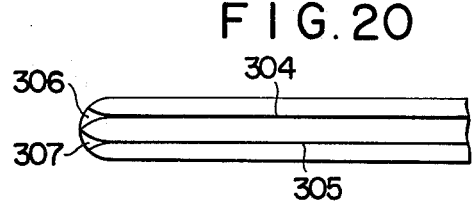
FIG. 20 is a fragmentary plan view of a recorded tape having a pair of recording grooves.

The playback head which is used in the playback unit of the invention is not limited to the magnetic head, but may be replaced by a sensor of a stylus type which is used in a usual disc player. FIG. 17 shows one example of a recorded tape which may be reproduced by a sensor of such stylus type. Specifically, a tape 300 is formed with a recording groove 301, and is adapted to be circulated within a playback unit. One end 302, the left-hand end in the example shown, of the recording groove 301 has an increased width and an increased depth as compared with the remainder of the groove, as shown in FIG. 18, facilitating the introduction of a stylus 303 into the groove 301. A tape formed with a recording groove may be made of a transparent material, so that a legible sentence may be entered on either side of the tape. FIG. 20 shows a similar tape having a pair of recording grooves 304, 305, both of which are broadened at their one end, as shown at 306 and 307, respectively. A playback unit which employs a stylus type sensor is similar in construction to those employing a magnetic head except for the related electrical means, and therefore will not be specifically described.

What is claimed is:

1. A system for repeatedly reproducing recorded information of a limited duration comprising in combination:
   a. a recording medium comprising at least one recording tape of predetermined length having respective information recorded thereon along at least one recording track extending in the lengthwise direction of the tape; and
   b. a playback unit comprising:
      i. means defining a circulating path for accommodating said tape for circulating therethrough, said path having a length longer than the tape length and an inlet for the tape;
      ii. means for continuously circulating the tape entered from said inlet around said path in one direction, said circulating means comprising: a stationary member disposed along the inside of said circulating path and having its outer surface finished smoothly; a plurality of rollers; and an endless belt entrained around said plurality of rollers and having a run which is maintained in sliding contact with the outer surface of said stationary member and serves as a driving means for the tape through the frictional engagement of one surface thereof with the tape, at least one of said rollers serving as a drive roller;
      iii. means disposed along said path for picking up the information recorded on the circulating tape;
      iv. means for reproducing the picked up information; and
      v. means for optionally diverting the circulating tape out of said path to deliver the same outside the unit.

2. A system according to claim 1 wherein said diverting means comprises means for changing the direction of circulation of the tape.

3. A system according to claim 1 wherein said path includes an outlet and said diverting means comprises a diverting member supported at said outlet for reciprocal motion between a first position in which the outlet is closed by a portion of said member and a second position in which said circulating path is closed by said member portion.

4. A system according to claim 3 wherein said diverting member comprises a pivotal lever having two arms one of which serves as said closing portion and the other of which extends externally of the playback unit.

5. A system according to claim 3 wherein said closing portion of said member comprises a tongue made from a resilient material.

6. A system according to claim 1 further comprising means for directing the tape to pass between said stationary member and said run of endless belt.

7. A system according to claim 1 wherein said circulating means further comprises another endless belt having a run which is entrained over said run of said first-mentioned endless belt, with the tape being adapted to pass between the runs of both belts.

8. A system according to claim 1 wherein said pick-up means comprises a magnetic head and said tape has the information magnetically recorded thereon along said track.

9. A system according to claim 1 wherein said pick-up means comprises stylus means for sensing said recorded information and said tape has the information recorded thereon in the form of a groove along said track.

10. A system according to claim 9 wherein said groove has at its front end an introduction portion having its width and depth progressively increasing toward the front end.

11. A system according to claim 1 wherein said track is formed on one surface of the tape and a title or similar illustration of the information recorded is imprinted on the other surface of the tape.

12. A system according to claim 11 wherein said tape is of a transparent material.

13. A system according to claim 1 wherein said tape has a plurality of recording tracks formed thereon in parallel relationship to each other.

14. A system according to claim 13 wherein said pick-up means comprises a corresponding number of sensing means for tracing respective tracks and means for enabling a selected one of the plurality of said sensing means to be effective.

15. A system according to claim 13 wherein said pick-up means comprises one sensing means selectively movable in the widthwise direction of the circulating tape into registration with each one of said tracks for tracing a selected track to pick up the information thereon.

16. A system according to claim 1 wherein said reproducing means comprises means for effecting an acoustic reproduction of the information recorded on the tape.

17. A system according to claim 1 wherein said playback unit further comprises a window for permitting the circulating tape to be viewed from the outside of the unit.

* * * * *